(No Model.) 3 Sheets—Sheet 1.

F. J. BERGMANN.
MACHINE FOR MAKING UPHOLSTERERS' NAILS.

No. 378,824. Patented Feb. 28, 1888.

Witnesses:
C. Sedgwick
J. M. Ritter.

Inventor:
F. J. Bergmann
By Munn & Co.
Attorneys.

(No Model.) 3 Sheets—Sheet 2.

F. J. BERGMANN.
MACHINE FOR MAKING UPHOLSTERERS' NAILS.

No. 378,824. Patented Feb. 28, 1888.

Witnesses:
C. Sedgwick.
J. M. Ritter

Inventor:
F. J. Bergmann
By Munn & Co
Attorneys.

(No Model.) 3 Sheets—Sheet 3.
F. J. BERGMANN.
MACHINE FOR MAKING UPHOLSTERERS' NAILS.
No. 378,824. Patented Feb. 28, 1888.
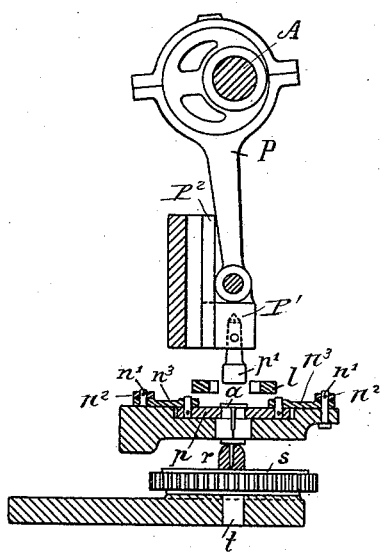
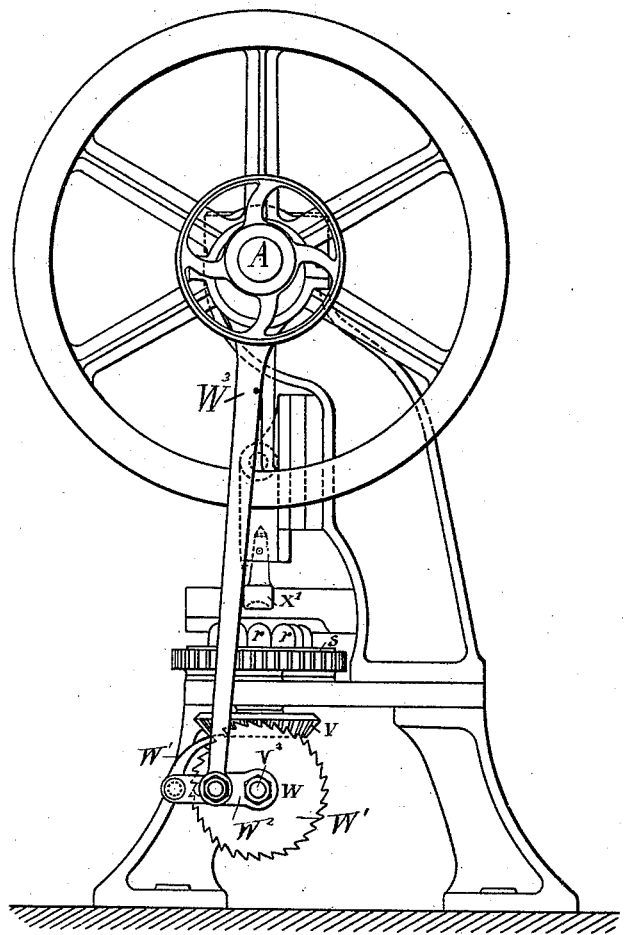
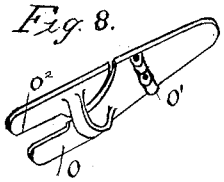
Witnesses:
C. Sedgwick.
J. M. Ritter.
Inventor:
F. J. Bergmann
By Munn & Co
Attorneys

UNITED STATES PATENT OFFICE.

FRANZ JOSEF BERGMANN, OF NEHEIM-ON-THE-RUHR, WESTPHALIA, GERMANY.

MACHINE FOR MAKING UPHOLSTERERS' NAILS.

SPECIFICATION forming part of Letters Patent No. 378,824, dated February 28, 1888.

Application filed June 1, 1887. Serial No. 239,955. (No model.)

*To all whom it may concern:*

Be it known that I, FRANZ JOSEF BERGMANN, of Neheim-on-the-Ruhr, Westphalia, Germany, have invented a new and Improved Nail-Making Machine, of which the following is a full, clear, and exact description.

The object of my invention is to provide a new and improved machine specially adapted for making nails provided with an iron shank and a brass head, such as upholsterers' nails, drawing-board tacks, &c.

The invention consists in the construction and arrangement of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
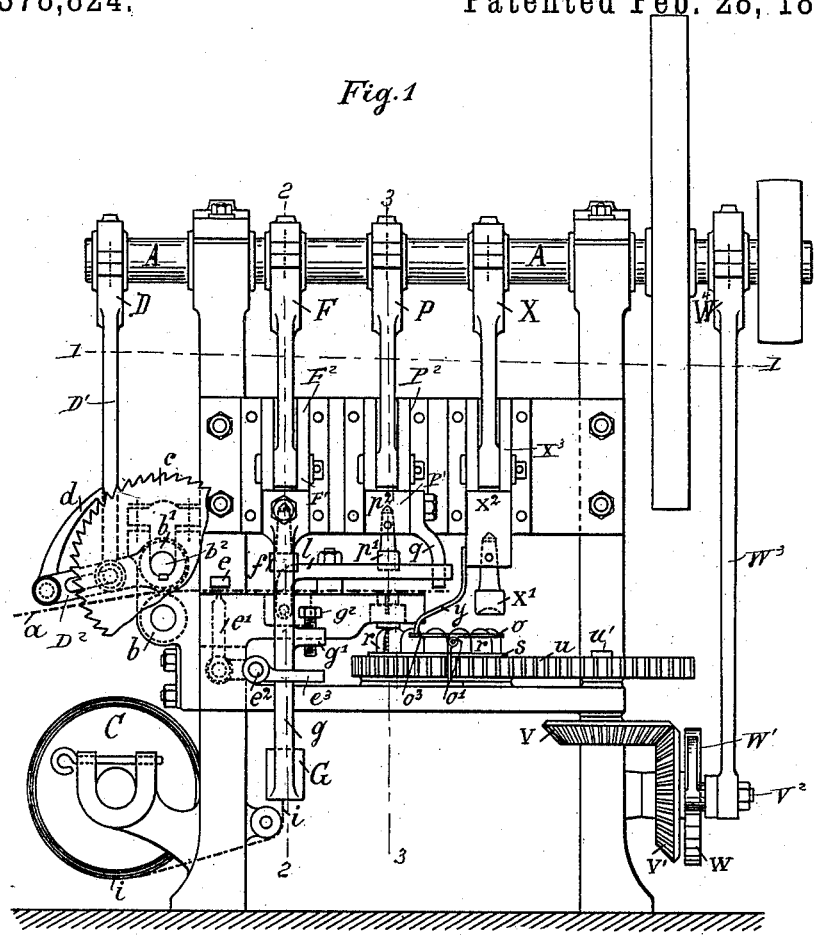
Figure 2:
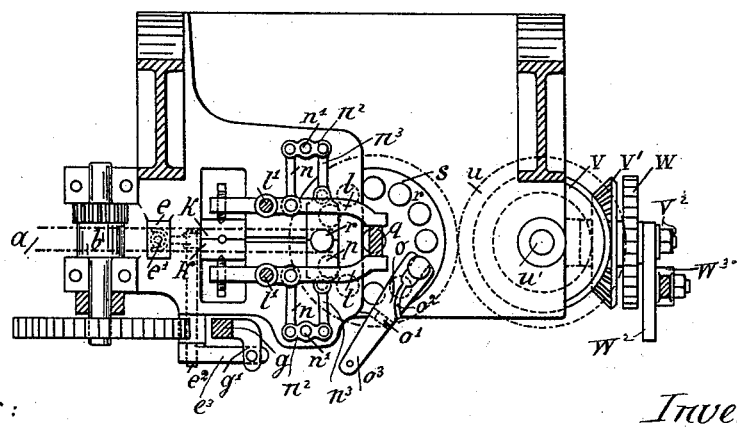
Figure 5:
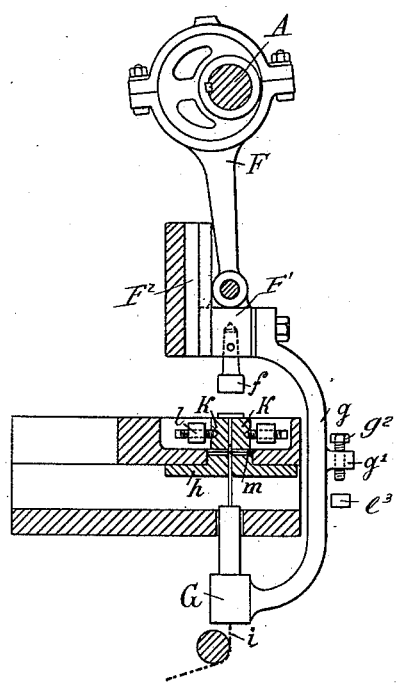
Figure 3:
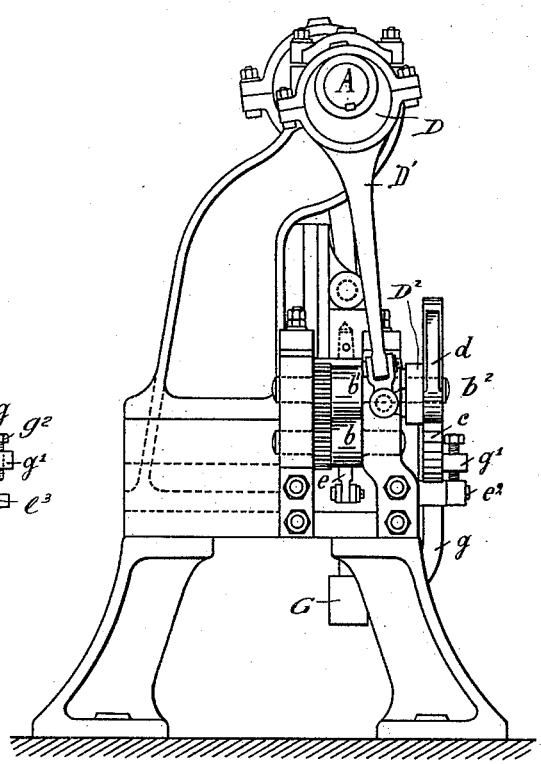
Figure 7:
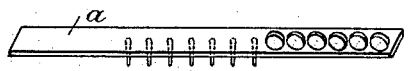

Figure 1 is a front elevation of my improvement. Fig. 2 is a sectional plan view of the same on the line 1 1 of Fig. 1. Fig. 3 is an end elevation of the same. Fig. 4 is a similar view of the other end of my improvement. Fig. 5 is a vertical cross-section of the same on the line 2 2 of Fig. 1. Fig. 6 is a similar view of the same on the line 3 3 of Fig. 1. Fig. 7 is a perspective view of the sheet-metal band after being operated on by the machine, and Fig. 8 is a perspective view of the extractor on an enlarged scale.

On a suitably-constructed frame is mounted the main driving-shaft A, receiving a rotary motion in the usual manner. On one end of the shaft A is mounted an eccentric, D, connected by its eccentric-rod D' with a pivoted arm, $D^2$, carrying the feed-pawl $d$, operating on the feed-ratchet wheel $c$, secured to one end of the spindle $b^2$, carrying the roller $b'$, connected by gear-wheels with the roller $b$, located directly below said roller $b'$, both rollers $b$ and $b'$ serving to feed the sheet-metal band $a$ into the machine for forming the heads of the nails. The arm $D^2$ is fulcrumed loosely on said spindle $b^2$ of the roller $b'$.

Next to the rollers $b$ and $b'$ is placed an anvil, $e$, held above the sheet-metal band $a$ and secured to the main frame. Under said anvil $e$ is held, to slide vertically, a punch, $e'$, which in its upward movement makes a small indentation on the under side of the sheet-metal band $a$, which is pressed against the anvil $e$ during the operation. The punch $e'$ is pivotally connected with the lever $e^3$, fulcrumed on the stud $e^2$, secured to the main frame, and the outer end of said lever $e^3$ is operated on by the lower end of a set-screw, $g^2$, screwing in a lug, $g'$, projecting from the arm $g$, secured at its upper end to the swage-head F', adapted to slide vertically in the guides $F^2$, secured to the main frame. The swage-head F' is moved up and down by the eccentric-rod F, connected with an eccentric mounted on the main shaft A. The up-and-down movement of said swage-head and an arm, $g$, operate on each downward stroke on said lever $e^3$, whereby the punch $e'$ is moved upward and makes its indention in the sheet-metal band $a$, as before described. The amount of throw given to the punch $e'$ is regulated by adjusting the set-screw $g^2$.

At the lower end of the arm $g$ is secured the clamping-head G, of any approved construction and operating in the usual manner. Through this clamping-head passes the wire $i$, which is unrolled from the reel C, mounted in any suitable manner on the main frame. The upward movement of the arm $g$ forces the end of wire $i$, projecting above the clamping-head G, through the plates $h$, which support the clamping-plates $m$, provided at their inner ends with sharp edges, so as to hold the upper end of said wire $i$ in place when the head G descends. The extreme upper end of the wire $i$ also passes through the gripping and cutting dies K, which are made in two parts and are of the usual construction, operating in such a manner as to cut the wire off to any desired length of shank to be made and at the same time sharpen the lower end of the wire.

As the construction of the knives K is well known, further description is not deemed necessary.

The upper end of the wire thus cut off by the dies K projects a short distance above the upper ends of said dies K, and it fits into the indentation made by the punch $e'$ in the sheet-metal band $a$, which is held on top of said dies $k$. The wire shank is now secured in the indentation of the sheet-metal band $a$ by the swage $f$, held in the swage-head F', which descends and secures the wire shank to the sheet-metal band $a$ in the usual manner. The dies K now move apart and permit a forward movement of the sheet-metal band $a$, so that the band $a$, with its respective shank, is moved upon the die $p$, made in two parts, having a sidewise movement, so as to open and close, and when closed forming a central aperture the upper edges of which are the cutting-edges for forming the head of the nail out of the sheet metal $a$. This is done by a planchet-cutter, $p'$, secured in the cutter-head $P'$, adapted to slide vertically in the guides $P^2$, formed on the main frame. The cutter-head $P'$ receives a vertical movement by an eccentric-rod, P, connected with an eccentric secured to the main shaft.

When the planchet-cutter $p'$ moves downward upon the sheet-metal band $a$, a round disk is cut out of the band $a$ as soon as the cutter $p'$ moves through the aperture of the die $p$. The cutter $p'$ forces the nail downward, so that the shank of the nail enters a central aperture made in the former $r$, located directly below the aperture in the die $p$. Whenever a nail is thus pressed by the cutter $p'$ into the former $r$, then the former, with its nail, is moved from under the aperture in the die $p$ and a new former takes its place. This is accomplished by arranging a number of formers $r$ in a circle on the top of the wheel $s$, as shown in the drawings. Said wheel $s$ is provided with a gear-wheel meshing into a gear-wheel, $u$, fastened on a vertical shaft, $u'$, mounted in suitable bearings on the main frame and carrying on its lower end a bevel gear-wheel, V, meshing into a bevel gear-wheel, V', mounted on a shaft, $V^2$, held in suitable bearings on the main frame and carrying a feed ratchet-wheel, W, which engages a feed-pawl, W', pivotally mounted on the feed-arm $W^2$, connected by the eccentric-rod $W^3$ with the eccentric $W^4$, mounted on the main shaft A.

On one of the formers $r$, directly opposite the one under the die $p$, operates a finishing-tool, X', secured to the head $X^2$, adapted to slide vertically in the guides $X^3$, secured to the main frame. The head $X^2$ is pivotally connected with the eccentric-rod X, connected with an eccentric mounted on the main shaft A. It will be seen that this finishing-tool X' when moved downward upon the flat head of the nail held in the respective former $r$ presses said flat head upon the upper rounded end of the former $r$, so that the sheet-metal disk assumes a round form according to the shape of the upper end of the former. As soon as the finishing-tool X' moves upward again the finished nail is removed from the former by the extractor $o$, pivoted at $o'$ to a bracket secured to the main frame.

The extractor $o$ is provided with a forked end, which fits on the former $r$, and the forked end continues into a slot, $o^2$, leading to the side, so that when the nail is removed from the former $r$ and the extractor $o$ assumes an inclined position then the nail drops out through said slot $o^2$ to one side of the machine. The other end, $o^3$, of the extractor $o$ is pivotally connected with an arm, $y$, secured to the head $X^2$, so that the latter imparts motion to said extractor $o$, which operates on a former next to the former on which said finishing-tool X' operates, as shown in Fig. 2. The slot $o^2$ divides the extractor into two parts, and the said parts are held together by a curved cross bar or plate, $o^4$, as shown in Fig. 8.

The opening and closing of the dies K is accomplished by the two levers $l$, fulcrumed on the studs $l'$, secured to the main frame and provided with set-screws connected with said dies K. The levers $l\,l$ are operated from the cutter-head P', which carries a downwardly-extending arm, $q$, which is cone-shaped at its lower end, its end passing between the outer ends of said levers $l\,l$, as shown in Figs. 1 and 2, so that on the downward motion of said cutter-head P' said levers $l\,l$ are pressed outward at one end and inward at the end connected with the dies K. The levers $l\,l$ are also connected by the links $n\,n$ with the levers $n^2$, fulcrumed on the studs $n'$, secured to the main frame, and said levers $n^2$ are connected by the links $n^3$ with the halves of the die $p$, which are thus opened and closed, as before described, by said levers $l\,l$ at the downward motion of the punch-head P' at the same time that the dies K are closed.

It will be seen that the sheet metal $a$ is fed into the machine by the rollers $b$ and $b'$ and passes under the anvil $e$, where it receives an indentation from the punch $e'$, after which the sheet-metal band is brought over the dies K with the indentation directly above the wire-shank cut off from the wire $i$ and held in said dies K. At this time the shank is secured in the indentation of the sheet-metal band $a$ by the swage $f$, after which the dies K are opened, as above described, and the sheet metal with its shank travels forward until held centrally in the die $p$, where the head of the nail is formed out of the sheet-metal band $a$ by the planchet-cutter $p'$; and said nail is also pressed by said cutter $p'$ into one of the formers $r$, and then finally the head of the nail is formed into the desired curved shape by the finishing-tool X' acting on the flat head and pressing said head into the shape of the upper end of the former $r$. The nail is then removed from the former by the extractors $o$.

The several parts of the machine move together correspondingly, and the amount of throw given to the several parts is regulated and adjusted according to the nail to be made.

Having thus fully described my invention, I claim as new, and desire to secure by Letters Patent—

1. In a nail-making machine, the combination, with an anvil, of a pivoted lever, a punch carried by the said lever, a reciprocating head, and an arm connected to the said head and provided with a lug engaging the free end of the punch-carrying lever, substantially as described.

2. In a nail-making machine, the combination, with an anvil, a reciprocating head, a pivoted lever, and a punch on one end of the said lever, of an arm connected to the reciprocating head and provided with a lug for engaging the free end of the punch-carrying lever, and with a wire-clamping head at its lower end, substantially as herein shown and described.

3. In a nail-making machine, the combination, with a reciprocating head and a swage carried thereby, of an arm secured to the said head and provided with a wire-clamping head on its lower end, and gripping and cutting dies arranged under the swage, substantially as herein shown and described.

4. In a nail-making machine, the combination, with the die $p$, made in two parts and adapted to be opened and closed, of the planchet-cutter $p'$, operating on said die and having a vertical movement, substantially as shown and described.

5. In a nail-making machine, the combination, with a reciprocating head, of a planchet-cutter carried by said head, a two-part die held under the cutter, a former under the die, and mechanism for separating the die, substantially as herein shown and described.

6. In a nail-making machine, the combination, with a reciprocating head, of a planchet-cutter carried by said head, a two-part die under the cutter, pivoted levers connected to the said die, an arm on the reciprocating head and adapted to pass between the ends of the levers, and a former under the die, substantially as herein shown and described.

7. In a nail-making machine, the combination, with reciprocating heads, a swage carried by one head, and a planchet-cutter carried by the other head, of gripping and cutting dies under the swage, a two-part die under the planchet-cutter, levers connected to the said dies and cutter, and an arm on one of the said reciprocating heads for operating the levers, substantially as herein shown and described.

8. In a nail-making machine, the combination, with the die $p$ and the planchet-cutter $p'$, of the formers $r$, secured in a circle on a revolving wheel, so that the said formers are successively brought directly under the said die $p$, substantially as shown and described.

9. In a nail-making machine, the combination, with reciprocating heads, a planchet-cutter carried by one head and a finishing-tool carried by the other head, of a two-part die under the planchet-cutter, pivoted levers connected to said dies, an arm on the cutter-head engaging the said levers, a former below the die, and mechanism for bringing the former under the finishing-tool, substantially as herein shown and described.

10. In a nail-making machine, the combination, with reciprocating heads, a planchet-cutter carried by one head and a finishing-tool by the other head, of a two-part die under the cutter and operated from the reciprocating cutter-head, a series of formers mounted in a circle on a wheel, and gearing for revolving said wheel, substantially as herein shown and described.

11. In a nail-making machine, the combination, with the gripping and cutting die K and the reciprocating head P', provided with the arm $q$, of the pivoted levers $l$, connected to the die and adapted to receive the arm $q$ between their ends, substantially as described.

12. In a nail-making machine, the combination, with the gripping and cutting die K, the pivoted levers $l$, and means for operating the levers, of the two-part die $p$, the pivoted levers $n^2$, the links $n$, connecting the levers $l\ n^2$ together, and the links $n^3$, connecting the levers $n^2$ with the die, substantially as herein shown and described.

13. In a nail-making machine, the combination, with a former, of a pivoted extractor having a forked end and a slot leading from the fork to one side, substantially as described.

14. In a nail-making machine, the combination, with a reciprocating head and a former, of a pivoted extractor having a forked end and a slot leading from the fork to one side, and a connection between the extractor and reciprocating head, substantially as herein shown and described.

In testimony that I claim the foregoing I have hereunto set my hand this 5th day of March, 1887.

FRANZ JOS. BERGMANN.

In presence of—
 ERNST OTTO,
 ADOLF OTTO.